(12) United States Patent
Nicholas et al.

(10) Patent No.: US 10,197,104 B2
(45) Date of Patent: Feb. 5, 2019

(54) SEALING SYSTEM FOR CONSTANT-VELOCITY JOINT

(71) Applicant: FORD GLOBAL TECHNOLOGIES, LLC, Dearborn, MI (US)

(72) Inventors: Chris Peter Nicholas, Milford, MI (US); Bradley W. Doner, Northville, MI (US); Rakesh Sharma, Novi, MI (US); Duane Allan Lewis, Westland, MI (US); Brian John Brown, Clinton Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 122 days.

(21) Appl. No.: 15/258,605

(22) Filed: Sep. 7, 2016

(65) Prior Publication Data
US 2018/0066714 A1    Mar. 8, 2018

(51) Int. Cl.
*F16D 3/22* (2006.01)
*F16D 3/84* (2006.01)
*F16D 3/223* (2011.01)

(52) U.S. Cl.
CPC .............. *F16D 3/84* (2013.01); *F16D 3/843* (2013.01); *F16D 3/223* (2013.01); *F16D 2003/22326* (2013.01); *F16D 2003/846* (2013.01); *Y10S 277/928* (2013.01); *Y10S 464/906* (2013.01); *Y10T 403/52* (2015.01); *Y10T 464/10* (2015.01)

(58) Field of Classification Search
CPC ... F16D 3/84; F16D 3/22; F16D 3/223; F16D 2003/846; Y10S 464/906; Y10S 277/928; Y10T 403/52; Y10T 464/10

USPC .......... 464/17, 146; 277/599; 384/477, 480, 384/489

See application file for complete search history.

(56) References Cited

U.S. PATENT DOCUMENTS

| | | | | |
|---|---|---|---|---|
| 4,372,565 | A | * | 2/1983 | Lien ..................... F16J 15/0881 277/928 |
| 5,833,372 | A | * | 11/1998 | Nisley ..................... F16C 33/76 384/480 |
| 6,540,616 | B2 | * | 4/2003 | Miller ..................... F16D 3/223 464/17 X |
| 7,029,399 | B2 | * | 4/2006 | Oki ......................... F16D 3/227 |
| 7,905,785 | B2 | | 3/2011 | Madden et al. |
| 8,167,726 | B2 | | 5/2012 | Wormsbaecher et al. |
| 8,197,346 | B2 | | 6/2012 | Miller et al. |

OTHER PUBLICATIONS

Universal Joint and Driveshaft Design Manual, AE-7, Society of Automotive Engineers, Inc., Warrendale, PA, pp. 99-101, TJ1079. S62 1979.*

* cited by examiner

*Primary Examiner* — Greg Binda
(74) *Attorney, Agent, or Firm* — James Dottavio; Brooks Kushman P.C.

(57) ABSTRACT

A constant-velocity joint includes an outer race, inner race, end cap, and seal. The outer race defines a cavity, an opening to the cavity, and a through hole configured to receive a fastener. The inner race is disposed within the cavity and is rotatably connected to the outer race via a plurality of ball bearings. The end cap is secured to the outer race and covers the opening. The seal is disposed between the outer race and the end cap. The seal defines a channel that is in fluid communication with the cavity and the through hole. The channel is configured to vent air between the cavity and through hole.

19 Claims, 3 Drawing Sheets

SEALING SYSTEM FOR CONSTANT-VELOCITY JOINT

TECHNICAL FIELD

The present disclosure relates to constant-velocity joints that may be used in vehicle systems.

BACKGROUND

Vehicle drivetrains include several intermediate rotating components that connect power generating components (e.g., internal combustion engines) to drive wheels. Rotating components of the drivetrain may be connected to each other via constant-velocity joints if the rotating components are configured to rotate about different axes.

SUMMARY

A constant-velocity joint includes an outer race, inner race, cap, and seal. The outer race defines a cavity, an opening to the cavity, and a through hole configured to receive a fastener. The inner race is disposed within the cavity and is rotatably connected to the outer race via a plurality of ball bearings. The end cap is secured to the outer race and covers the opening. The seal is disposed between the outer race and the end cap. The seal defines a channel that is in fluid communication with the cavity and the through hole. The channel is configured to vent air between the cavity and through hole.

A vehicle drivetrain includes a constant-velocity joint that has an inner race, an outer race, and a cap. The outer race defines a cavity and fastener holes. The inner race is disposed within the cavity. The first and second shafts are fixedly coupled to the inner and outer races, respectively. The cap is secured to the outer race covering the cavity. The seal is disposed between the outer race and the cap, the seal defines a vent channel between the cavity and one of the fastener holes.

A seal includes body that includes an exterior perimeter and an interior perimeter that defines a central opening. The seal also includes a plurality of protrusions that extend outward and terminate along the exterior perimeter. At least one of the protrusions defines a channel that has a winding configuration that extends from the interior perimeter to the exterior perimeter.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
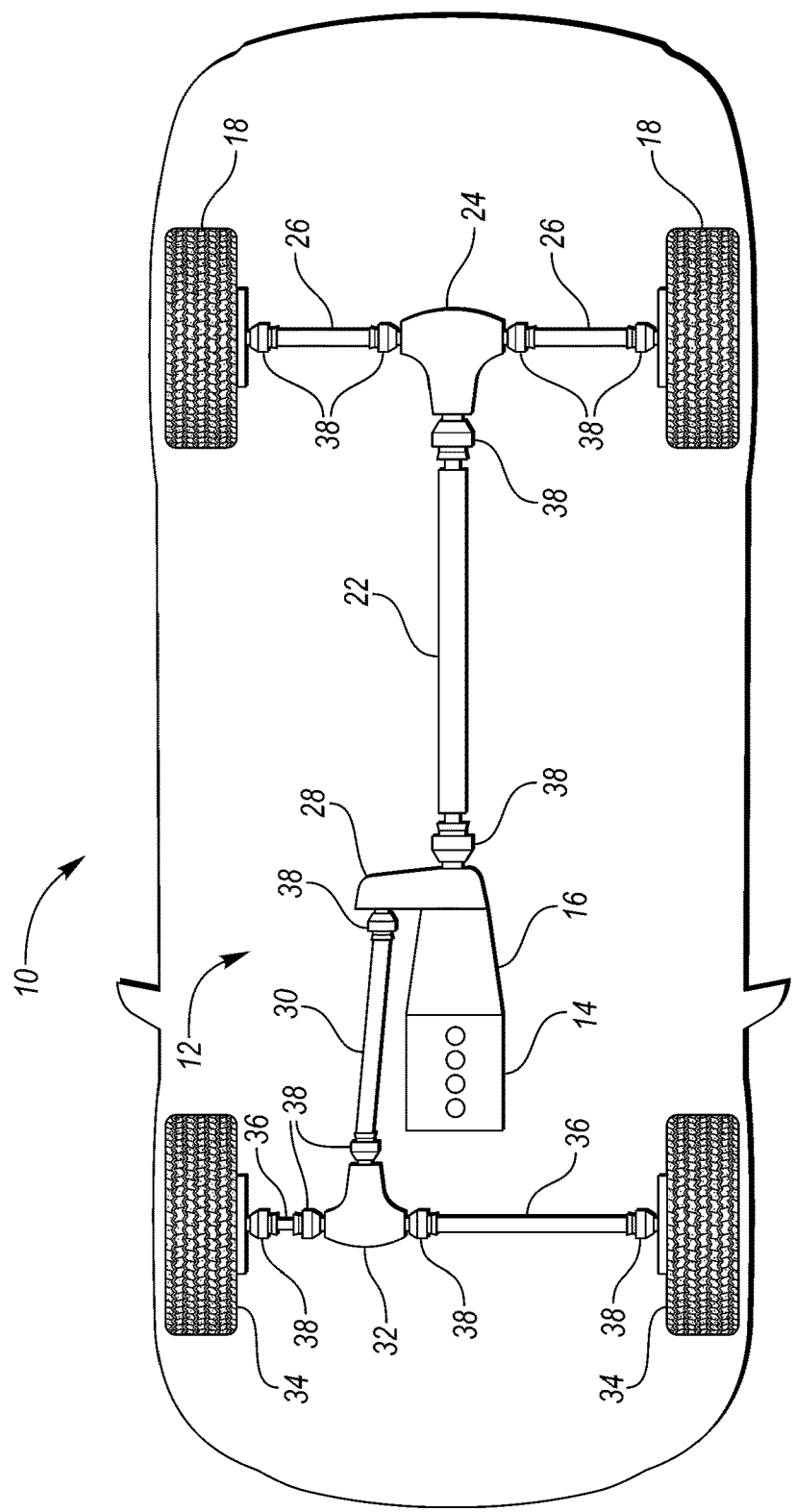
FIG. 1 is a schematic diagram representative of an exemplary vehicle and an exemplary vehicle powertrain.

Referring to FIG. 1, a schematic diagram representative of a vehicle 10 and a vehicle powertrain 12 is illustrated. The powertrain 12 includes power generating components (i.e., engines or electric motors) and the drivetrain. The drivetrain is the group of components that deliver power to the driving wheels, excluding the power generating components. In contrast, the powertrain 12 is considered to include both the power generating components and the drivetrain. The powertrain 12 may include an engine 14 and a transmission 16. The powertrain 12 may utilize other power generating components (e.g., electric motors or fuel cells) in addition to or in lieu of the engine 14. The transmission 16 may be configured to provide multiple gear ratios between an input and an output of the transmission 16. The engine 14 is connected to the input of the transmission 16 while drivetrain components that are configured deliver power to rear wheels 18 are connected to an output of the transmission 16. More specifically, the engine 14 may be connected to an input shaft of the transmission by a torque converter or a launch clutch while an output shaft of the transmission 16 may be connected to a rear driveshaft 22. The rear driveshaft 22 may then be connected to a rear drive unit (RDU) 24. The RDU 24 may then be connected to the rear wheels 18 by rear half shafts 26. The RDU 24 may include a differential and/or one more clutches to control the power output to the rear wheels 18.

The powertrain 12 may also include a power transfer unit (PTU) 28, which also may be called a power takeoff unit or transfer case, disposed between the transmission 16 and the rear driveshaft 22. The PTU 28 may include a clutch that selectively couples a front driveshaft 30 to the output of the transmission 16. The front driveshaft 30 may then be connected to a front drive unit (FDU) 32. The FDU 32 may then be connected to the front wheels 34 by front half shafts 36. The FDU 32 may include a differential and/or one more clutches to control the power output to the front wheels 34.

The various components of the powertrain 12, including the output shaft of the transmission 16, rear driveshaft 22, RDU 24, half shafts 26, rear wheels 18, PTU 28, front driveshaft 30, front half shafts 36, and front wheels 34 may be connected to each other, as described above, via constant-velocity joints 38. Constant-velocity joints connect two rotating parts and allow the two rotating parts to rotate about different axes.

Although FIG. 1 depicts a rear-wheel drive vehicle that is capable operating in a four-wheel drive or all-wheel drive (AWD) mode via the PTU 28, the disclosure should not be construed as limited to rear-wheel drive vehicles. For example, the vehicle may be a front wheel drive vehicle that includes a power source (e.g., engine or electric motor) that is connected to a transaxle which in turn is connected to the front wheels. The transaxle may include a differential that is connected to the front wheels by half shafts. Constant-velocity joints may be disposed between any mating parts (e.g., between the half shaft and the wheels or between the half shaft and the transaxle. A PTU may also be connected to the transaxle. The PTU may be connected to an RDU in the same manner as described above relative the rear-wheel drive vehicle depicted in FIG. 1. When engaged the PTU may be configured to transfer power from the from axle to the RDU.

The PTUs and RDUs, in all embodiments, may function in the same manner as a differential to allow a speed differential between the wheels on a single axle. Clutches within the PTUs and the RDUs may be controlled to limit the speed differential between the wheels on a single axle such that the PTUs and RDUs operates as a limited slip differential. The PTUs and the RDUs may be controlled in unison allow a speed differential between the wheels located on of the different axles of the vehicle. Controlling the PTUs and the RDUs to allow a speed differential between the wheels located on different axles of the vehicle may be referred to as an AWD mode.

It should be understood that the vehicle configuration described herein is merely exemplary and is not intended to be limited. Other non-hybrid, electric, or hybrid vehicle configurations should be construed as disclosed herein. Other vehicle configurations may include, but are not limited to, micro-hybrid vehicles, series hybrid vehicles, parallel hybrid vehicles, series-parallel hybrid vehicles, plug-in hybrid electric vehicles (PHEVs), fuel cell hybrid vehicles, battery operated electric vehicles (BEVs), or any other vehicle configuration known to a person of ordinary skill in the art.

Figure 2:
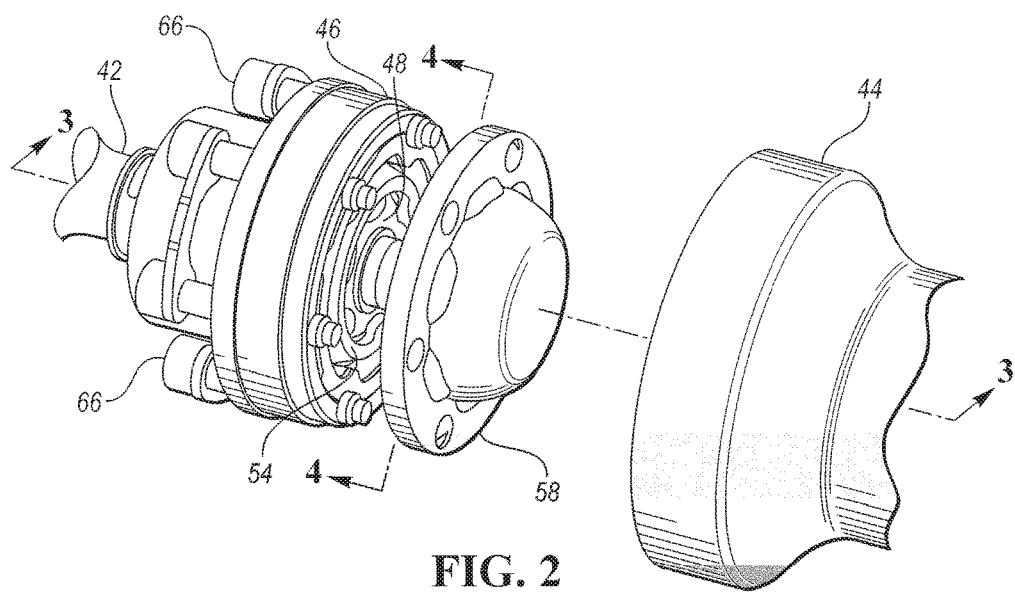
FIG. 2 is a partially-exploded isometric view of an exemplary constant-velocity joint that is connected to a rotating input and a rotating output.
Figure 3:
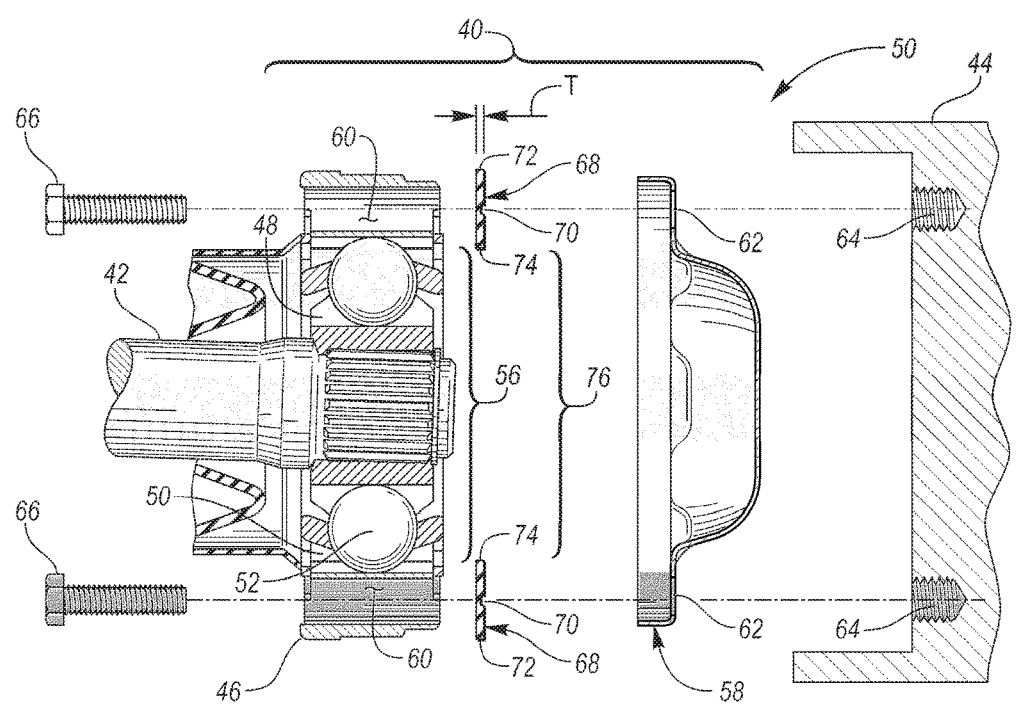
FIG. 3 is a cross-sectional view taken along line 3-3 in FIG. 2.
Figure 4:
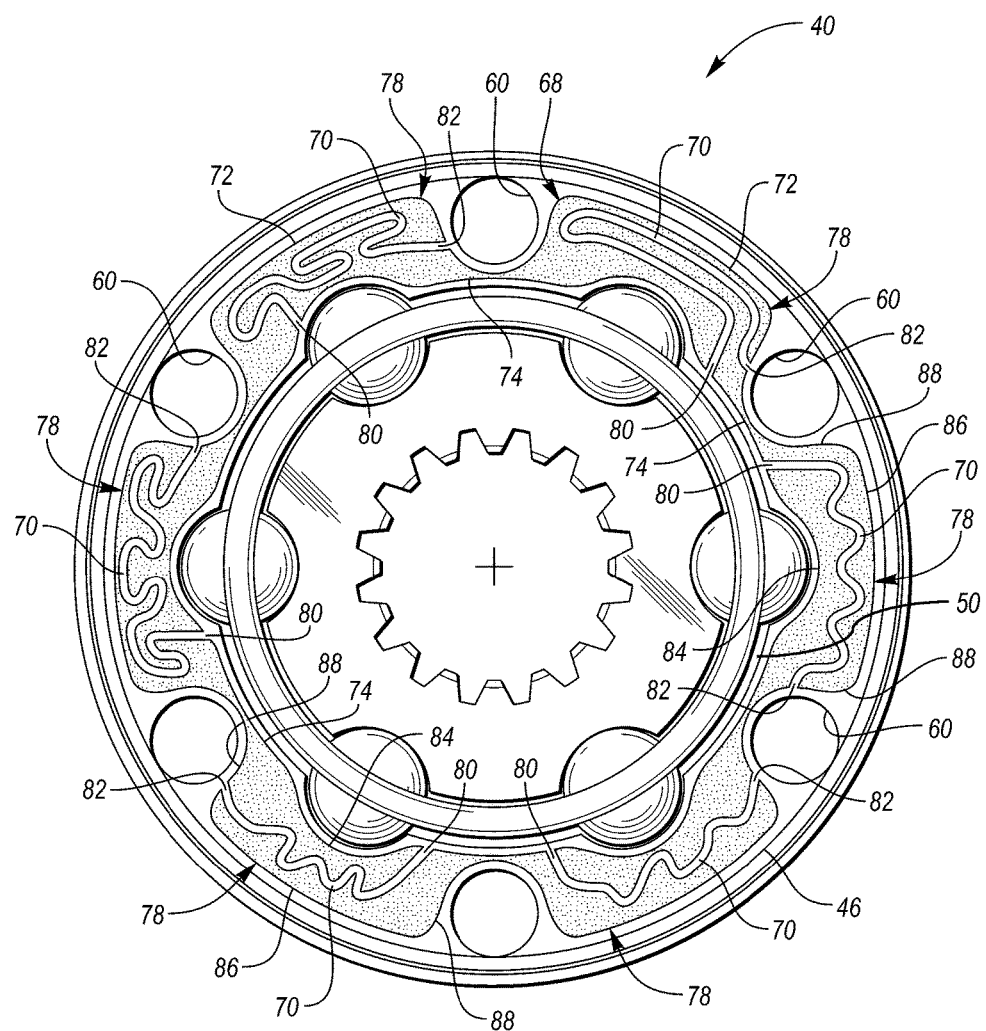
FIG. 4 is a front view of the constant-velocity with the end cap removed.

Referring to FIGS. 2-4, an exemplary constant-velocity joint 40 that is connected to a rotating input 42 and a rotating output 44. The constant-velocity joint 40 may be any of the constant-velocity joints 38 depicted in FIG. 1 or described above. The rotating input 42 and rotating output 44 may be any of the components depicted in FIG. 1 or described above that are connected to each via a constant-velocity joints. The rotating input 42 and rotating output 44 may be any type of component that is capable transmitting rotational power or torque, such as, but not limited to, shafts, drums, shells, flanges, etc.

The constant-velocity joint 40 includes an outer race 46 and an inner race 48. The outer race 46 defines cavity 50. The inner race 48 is disposed within the cavity 50. The inner race 48 is rotatably connected to the outer race by plurality of ball bearings 52. The ball bearings 52 may be disposed within a bearing cage 54 that is located between the outer race 46 and the inner race 48. The outer race 46 may also define an opening 56 to the cavity 50. An end cap 58 may be secured to the outer race 46. The end cap 58 may cover the opening 56 when secured to the outer race 46. The inner race 48 may define a splined opening that receives a splined shaft portion of the rotating input 42. The outer race 46 may also define a plurality of through holes (or fastener holes) 60. The end cap 58 may also define a second plurality of through holes (or fastener holes) 62 that are configured to align with the plurality of through holes 60 in the outer race 46. The rotating output 44 may define a plurality of tapped holes 64 that are also configured to align with the plurality of through holes 60 in the outer race 46. A plurality of fasteners 66 may be configured to pass through the plurality of through holes 60 in the outer race 46, through the second plurality of through holes 62 in the end cap 58, and into the tapped holes 64 in the rotating output 44 in order to affix the end cap 58 and rotating output 44 to the outer race 46. A seal 68 may be disposed between the outer race 46 and the end cap 58 when the outer race 46, the end cap 58, and the rotating output 44 are affixed to each other.

The seal 68 may define at least one channel 70 that is in fluid communication with the cavity 50 and at least one of the through holes 60 in the outer race 46. The at least one channel 70 may also be in fluid communication with at least one of the through holes 62 in the end cap 58. Fluid communication may refer to the ability of a fluid (i.e., a liquid or a gas) to flow through an open space, such as the channel 70 in the seal 68. Specifically, the at least one channel 70 may be configured to vent air between the cavity 50 and at least one of the through holes 60 in the outer race 46 and/or to vent air between the cavity 50 and at least one of the through holes 62 in the end cap 58. In the depicted embodiment, the seal 68 defines a plurality of channels 70, the outer race 46 defines the plurality of through holes 60, and the end cap 58 also defines a plurality of through holes 62. Also in the depicted embodiment, each of the plurality of channels 70 are in fluid communication with the cavity 50 and one of the plurality of through holes 60 in the outer race 46 and/or one of the plurality of through holes 62 in the end cap 58. The disclosure should not be construed as limited to a seal 68 that includes the number of channels 70 that are fluid communication with the cavity 50 and a through hole 60 in the outer race 46 and/or a through hole 62 in the end cap 58, but should be construed to include a seal that has one or more channels that are fluid communication with the cavity defined by an outer race of a constant-velocity joint and a through hole in the outer race of the constant velocity joint and/or a through hole in an end cap of the constant-velocity joint.

The body of the seal 68 may include an exterior perimeter (or exterior or outer surface) 72 and an interior perimeter (or interior or inner surface) 74. The interior perimeter 74 may define a central opening 76 of the seal 68. The seal 68 may have a shape that wraps around each of the through holes 60 in the outer race 46 such that the seal 68 does not overlap the through holes 60. A plurality of protrusions 78 may extend outward from the interior perimeter 74 and terminate along the exterior perimeter 72. The protrusions 78 may be disposed in between the through holes 60 in the outer race 46. The number of protrusions 78 may correlate with the number of through holes 60 in the outer race 46.

Each of the protrusions 78 may define one of the channels 70 that are in fluid communication with the cavity 50 and one of the through holes 60 in the outer race 46 and/or one of the through holes 62 in the end cap 58. The channels 70 may extend from the interior perimeter 74, proximate to the cavity 50, to the exterior perimeter 72, proximate to one of the through holes 60 in the outer race 46, and/or one of the through holes 62 in the end cap 58, in a winding configuration. The winding configuration of the channels 70 may include several bends or turns making it difficult for liquids to flow between the cavity 50 and the through holes 60 in the outer race 46 or through holes 62 in the end cap 58, while still allowing gases to flow between the cavity 50 and the through holes 60 in the outer race 46 or through holes 62 in the end cap 58. For example, water on the outside of the constant-velocity joint 40 may be kept from flowing into the cavity 50 from the through holes 60 in the outer race 46 and/or through holes 62 in the end cap 58, while still allowing air to flow between the cavity 50 and the through holes 60 in the outer race 46 and/or the through holes 62 in the end cap 58. Another example may include keeping a lubrication liquid, such as grease, from flowing from the cavity 50 to the through holes 60 in the outer race 46 and/or through holes 62 in the end cap 58, while still allowing air to flow between the cavity 50 and the through holes 60 in the outer race 46 and/or through holes 62 in the end cap 58. The bends or turns in the channels 70 may include changes in the direction of the channels 70 at any increment ranging between 0 degrees and 360 degrees.

Each of the winding configurations in the channels 70 are shown for exemplary purposes only. All or some of the channels 70 may include similar winding configurations, while other channels 70 may include dissimilar winding configurations. In addition, the disclosure should be construed to include seals 68 having channels 70 that are organized in a winding configuration of any shape, not just the shapes depicted in FIG. 4.

The channels 70 may extend partially through a thickness T of the seal 68 as shown in FIG. 3. If the channels 70 extend partially through the thickness T of the seal 68, the channels 70 may be defined on a surface that faces the outer race 46 or on the opposing surface that faces the end cap 58. Alternatively, the channels 70 may extend all of the way through the thickness T of the seal 68. In an embodiment where the channels 70 extend all of the way through the thickness T, the seal 68 may be composed of several components that are configured to fit together in a jigsaw puzzle type fashion.

The protrusions 78 may define inlets 80 from the central opening 76 of the seal 68 to the channels 70. The protrusions 78 may also define outlets 82 from the channels 70 to the exterior perimeter 72 of the seal 68. The inlets 80 may be disposed adjacent to the cavity 50 while the outlets are disposed adjacent to the through holes 60 in the outer race 46 and/or through holes 62 in the end cap 58 to allow for fluid communication between the cavity 50 and the through holes 60 in the outer race 46 and/or through holes 62 in the end cap 58. The inlets 80 may extend in a first direction while the outlets 82 extend in a second direction. The relative angle between the inlets 80 and the outlets 82 for each particular channel 70 may extend in directions that are at an angle that ranges from 60 degrees to 120 degrees relative to each other. The protrusions 78 may each have a root 84 that forms the base of the protrusions 78, a crest 86 that forms the outer end of the protrusion, and a pair of flanks 88 that form the side portions of the protrusions 78. The flanks 88 may be disposed adjacent to the through holes 60 in the outer race 46 and/or through holes 62 in the end cap 58. The outlets 82 may extend to the exterior perimeter 72 at the flanks 88 of the protrusions 78.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A constant-velocity joint comprising:
   an outer race defining a cavity and fastener holes;
   an inner race disposed within the cavity;
   a cap secured to the outer race and covering the cavity; and
   a seal disposed between the outer race and cap, the seal defining a vent channel that extends in a winding configuration from the cavity to one of the fastener holes.

2. The constant-velocity joint of claim 1, wherein the channel extends from an inner surface of the seal to an outer surface of the seal.

3. The constant-velocity joint of the claim 1, wherein the channel includes at least one change in direction that is less than 90 degrees.

4. The constant-velocity joint of the claim 1, wherein the channel includes at least one change in direction that ranges from 90 degrees to 180 degrees.

5. The constant-velocity joint of the claim 1, wherein the channel includes at least one change in direction that is greater than 180 degrees.

6. A constant-velocity joint comprising:
   an outer race defining a cavity and a plurality of fastener holes;
   an inner race disposed within the cavity;
   a cap secured to the outer race and covering the cavity; and
   a seal disposed between the outer race and cap and having a plurality of radially outward extending protrusions, each protrusion defining a vent channel that extends in a winding configuration from the cavity to one of the fastener holes.

7. The constant-velocity joint of claim 6, wherein the channel extends from an inner surface of the seal to an outer surface of the seal.

8. The constant-velocity joint of the claim 6, wherein the channel includes at least one change in direction that is less than 90 degrees.

9. The constant-velocity joint of the claim 6, wherein the channel includes at least one change in direction that ranges from 90 degrees to 180 degrees.

10. The constant-velocity joint of the claim 6, wherein the channel includes at least one change in direction that is greater than 180 degrees.

11. The constant-velocity joint of the claim 6, wherein at least one of the protrusions defines an inlet from the cavity to the channel and an outlet from the channel to one of the fastener holes, wherein the inlet extends at an angle that ranges from 60 degrees to 120 degrees relative to the outlet.

12. A constant-velocity joint comprising:
    an outer race defining a cavity, an opening to the cavity, and a through hole configured to receive a fastener;
    an inner race disposed within the cavity and rotatably connected to the outer race via a plurality of ball bearings;
    an end cap secured to the outer race and covering the opening; and
    a seal disposed between the outer race and end cap, the seal defining a channel that extends from an inner surface of the seal to an outer surface of the seal in a winding configuration and is in fluid communication with the cavity and through hole, wherein the channel is configured to vent air between the cavity and through hole.

13. The constant-velocity joint of claim 12, wherein the channel includes at least one change in direction that is less than 90 degrees.

14. The constant-velocity joint of claim 12, wherein the channel includes at least one change in direction that ranges from 90 degrees to 180 degrees.

15. The constant-velocity joint of claim 12, wherein the channel includes at least one change in direction that is greater than 180 degrees.

16. The constant-velocity joint of claim 12, wherein the outer race defines a plurality of first through holes and the seal defines a plurality of channels, each channel in fluid communication with the cavity and one of the plurality of first through holes, wherein each of the plurality of channels is configured to vent air from the cavity to one of the plurality of first through holes.

17. The constant-velocity joint of claim 16, wherein the end cap includes a plurality of second through holes that are aligned with the plurality of first through holes and wherein each of the plurality of channels is configured to vent air from the cavity to one of the plurality of second through holes.

18. The constant-velocity joint of claim 17, wherein the end cap is secured to the inner race by a plurality of fasteners, wherein each of the plurality of fasteners extends through both one of the plurality of first through holes and one of the plurality of second through holes.

19. The constant-velocity joint of claim 12, wherein the channel extends partially through a thickness of the seal.

* * * * *